United States Patent [19]
Goodwin

[11] Patent Number: 5,134,573
[45] Date of Patent: Jul. 28, 1992

[54] METHOD TO EXTEND THE LINEAR RANGE OF IMAGES CAPTURED ON FILM

[75] Inventor: Robert M. Goodwin, Rochester, N.Y.

[73] Assignee: Eastman Kodak Company, Rochester, N.Y.

[21] Appl. No.: 794,353

[22] Filed: Nov. 12, 1991

Related U.S. Application Data

[63] Continuation of Ser. No. 456,764, Dec. 26, 1989, abandoned.

[51] Int. Cl.$^5$ .......................... H04N 1/40; G03F 3/00
[52] U.S. Cl. ..................... 364/525; 364/526; 364/577
[58] Field of Search ............ 364/525, 526, 577; 358/75, 80, 37, 456, 298; 356/404; 354/426

[56] References Cited

U.S. PATENT DOCUMENTS

| Re. 33,244 | 6/1990 | Davis et al. ............... | 364/526 |
|---|---|---|---|
| 4,500,919 | 2/1985 | Schreiber ................. | 358/78 |
| 4,639,769 | 1/1987 | Fleisher et al. ............ | 358/22 |
| 4,924,323 | 5/1990 | Nomakura et al. .......... | 358/298 |
| 4,956,718 | 9/1990 | Numakura et al. .......... | 358/298 |
| 4,977,521 | 12/1990 | Kaplan ................... | 364/525 |

FOREIGN PATENT DOCUMENTS 8731006 11/1987 European Pat. Off.
0267805 5/1988 European Pat. Off.

Primary Examiner—Parshotam S. Lall
Assistant Examiner—Ellis B. Ramirez
Attorney, Agent, or Firm—Edward Dugas

[57] ABSTRACT

This invention relates to a method for increasing the range of values representing a color image which exhibit a linear response. To increase the linear range, look-up tables are formed which straighten the toe and shoulder regions of film's three density vs log exposure curves up to a prescribed limit. The values of the minimum densities for the piece of film containing the image are determined. The representative values of the image are then aligned with the input values of the look-up tables by a relative shift of the image values and the table values so that the minimum density values of the image equal the minimum density values in the look-up tables. The color density image is then processed through the look-up tables to increase its linear range.

29 Claims, 2 Drawing Sheets

METHOD TO EXTEND THE LINEAR RANGE OF IMAGES CAPTURED ON FILM

This is a continuation of application Ser. No. 456,764, filed Dec. 26, 1989, now abandoned.

TECHNICAL FIELD OF THE INVENTION

The present invention relates generally to color image reproduction apparatus and associated methods. More particularly, the invention relates to a method for increasing the linear range of color images captured on color film.

BACKGROUND OF THE INVENTION

Color image reproduction systems known in the art permit images which have been recorded on photographic film to be scanned at a multiplicity of points, and converted to digital red (R), green (G), and blue (B) values. These digital values may be manipulated by a digital computing means to achieve improvements in the image characteristics which they represent, and then they may be converted to a visible form such as a print, transparency, or an image on a video monitor using any one of a number of digital image reproduction means known to the art. For example, U.S. Pat. No. 4,500,919 entitled "COLOR REPRODUCTION SYSTEM" by W. F. Schreiber discloses an image reproduction system of one type in which an electronic reader scans an original film based color image, which may be in the form of a transparency or print, and converts it to a digital image. A computer workstation and an interactive operator interface, including a video monitor, permit an operator to edit the image by means of displaying it on the monitor. When the operator has composed a desired image on the monitor, the workstation causes the output writer device to make an inked output of the reproduced image.

The present invention may be used in such a system, but is not limited to a system with an interactive operator interface. It may also be used in an automatic system in which the original film based color image is scanned and the analog signals so generated converted to a representative digital value, processed by a pre-selected set of algorithms, and output to a writer which makes a reproduced image or output to an image storage device for later reproduction using by any of a number of devices.

Using color negative or transparency film as the original capture media carries with it some benefits not normally available to other capture media such as video and "instant" photographic products. Among the benefits of using a color negative film is its long exposure latitude, which may exceed an exposure range corresponding to 1.8 relative log exposure, or six camera stops. Cameras which are designed primarily to record images using negative film often take advantage of this latitude to simplify their exposure control requirements. Among the advantages of a color transparency film is its large dynamic range which may exceed a transmittance ratio of 1000 to 1. Images captured on transparencies retain a natural look not achieved by other lower dynamic range media.

It may be noted that most natural scene elements modify the incident illumination by reflecting a fraction of the light. In ordinary circumstances, this fraction is primarily a property of the object and very little a property of the level of the illumination. Because of this, the human visual system has developed the ability to recognize the reflectance of objects even when illuminated by very different types and levels of illumination. Image recording and reproduction systems are required to record scenes under similar variations in the type and level of the illumination. In order to preserve a tone scale which is satisfying to a human observer, they must preserve at least the relative reflectances in the final reproduction of the image. In so doing, they may be required to adjust the range of the input image to accommodate the output imaging medium's dynamic range, and they may be required to modify the contrast of the input image to accommodate the output imaging media and viewing conditions.

Adjusting the input range to accommodate the output range while preserving reflectances, requires multiplication in the scene relative exposure space, while adjusting the contrast would require exponentiation. However if the logarithm of the relative scene exposure is used, then adjusting the range (i.e., rebalancing) can be done by additions, and contrast changes may be done by multiplications.

As is well known to those skilled in the art, the relationship between the exposure received by an individual area of photographic film and the subsequent transmission of that area after development is usually expressed graphically using logarithmic axes. Considering the foregoing, this expression of the transmission of the film in terms of its density offers a number of obvious advantages, especially when the image on film is converted to digital form by scanning and processed by a computer means.

First, over the majority of its range, the relationship between log relative scene exposure and density is approximately linear. This means that the digital images stored as densities may be rebalanced by simple additions (or subtractions), and they may have their contrast adjusted by multiplications while preserving the reproductions of at least the relative scene reflectances. This avoids a distortion of the output image's tone scale.

Second, since the human visual system's contrast sensitivity is more nearly logarithmic than linear, the use of density is a more efficient means of digitally coding the image data. This means that fewer digital bits are required to preserve the high quality image that is recorded in the negative or positive film.

However as is also known to those skilled in the art, the relationship between the logarithm of the exposure and the density formed in the film is not even reasonably linear near the ends of the scale; that is in the "toe" and "shoulder" region of the curves. This fact limits the range over which the tone scale of an output image may be reproduced without distortion both in contrast and in color balance.

The shape of the toe and shoulder may be different for different emulsion formulations. So, for instance, the shapes of the toes and shoulders for negative films are distinctively different from the shapes for transparency films. Furthermore, the shapes for different types of negative films may be different for different emulsions, for instance, KODAK EKTAR25 has a different toe shape than does KODAK GOLD400 film. The same is true for different types of transparency films.

Beyond the differences in shape, the absolute level of the minimum density found within different samples of the same emulsion can change depending on the conditions under which the film was used and processed. This difference can be approximately described as a shift of the emulsion's density vs log exposure curve up and down the density axis.

SUMMARY OF THE INVENTION

The object of this invention is to extend the range of original scene exposures over which images captured on film retain their linear character, with all the intendant advantages thereto, when the image is scanned and converted to digital form. This is accomplished by an inverse shaping operation in which the contrast of the "toe" and "shoulder" regions of the individual R,G,B density vs log exposure curves are raised to be equal to that of the midscale contrast in so far as is practical.

More particularly in accordance with this invention a method for increasing the practical linear range of images captured on color film comprising the steps of:

(a) forming inverse look-up tables (LUT's) which can be used to increase contrast between the density values in the toe and shoulder of a film's standard density vs log exposure curves to values which are more nearly representative of mid scale portions of the curves;

(b) sampling at a multiplicity of points using sensors that are sensitive to the red, green, and blue portions of the spectrum the transmission of non image bearing portion of color film wherein a measurement of the minimum densities of the same film that also contains an image bearing area may be found;

(c) converting analog samples of the transmission values to corresponding digital values;

(d) converting the digital transmission values to digital density values;

(e) searching the density values to find an estimate of the minimum density values for that piece of film;

(f) applying steps (b), (c), and (d) except to image bearing portion of the same film to acquire an R,G,B digital density image;

(g) shifting the image of step (f), or the LUT's of step (a), so that the actual minimum density values found in step (e) match the standard minimum density values used in step (a); and (h) processing the shifted digital image data acquired in step (g) through the LUT's of step (a), or processing the digital image data acquired in step (f) through the shifted LUT's generated in step (g).

DETAILED DESCRIPTION OF THE PREFERRED EMBODIMENTS

Figure 1:
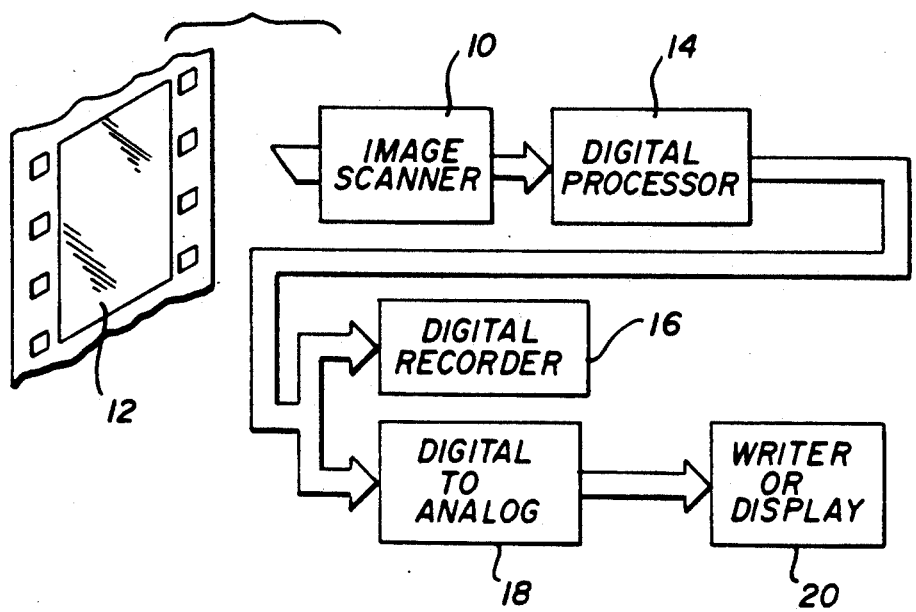
FIG. 1 is a block diagram of a digital image processing system which may be used to extend the range of the original scene exposures over which images captured on film retain their linear character.

Before describing in detail the particular method of achieving an extended range of original scene exposures over which the image captured on film retains its linear character, it should be observed that the present invention resides primarily in a novel combination of steps to generate and utilize an inverse shaping LUT which are readily executed using conventional digital image scanning and processing circuit and components. Accordingly, the structure, control, and arrangement of such conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of FIG. 1 does not necessarily represent the mechanical structural arrangement of the exemplary system, but are primarily intended to illustrate the major structural components of the overall image scanning and processing system in a convenient functional grouping, whereby the present invention may be more readily understood.

FIG. 1 is a block diagram of an overall digital image processing system. An image scanner 10 outputs digitally encoded values representative of the R,G,B color content at an NXM array of spatial sampling points taken from film image 12. These R,G,B digital values are coupled to a programmed digital processor 14, which could be, for example, a general purpose VAX digital computer sold by the Digital Equipment Corporation or a special purpose computer designed for a specific image processing system. In any case the computer is programmed to perform the steps to be described below with reference to FIG.'s 2 and 3, and through which the R,G,B digital values are controllably modified in order to effect the extension of the linear range desired. The modified R,G,B values may be further processed to affect other desired improvements in the processor 14 before being sent to a digital recorder 16 for digital encoding and storage for later use, or before being sent to a digital-to-analog converter 18, and then sent to a writer or display device 20, such as a color print engine or display, whereat the contrast adjusted image is reconstructed.

Figure 2:
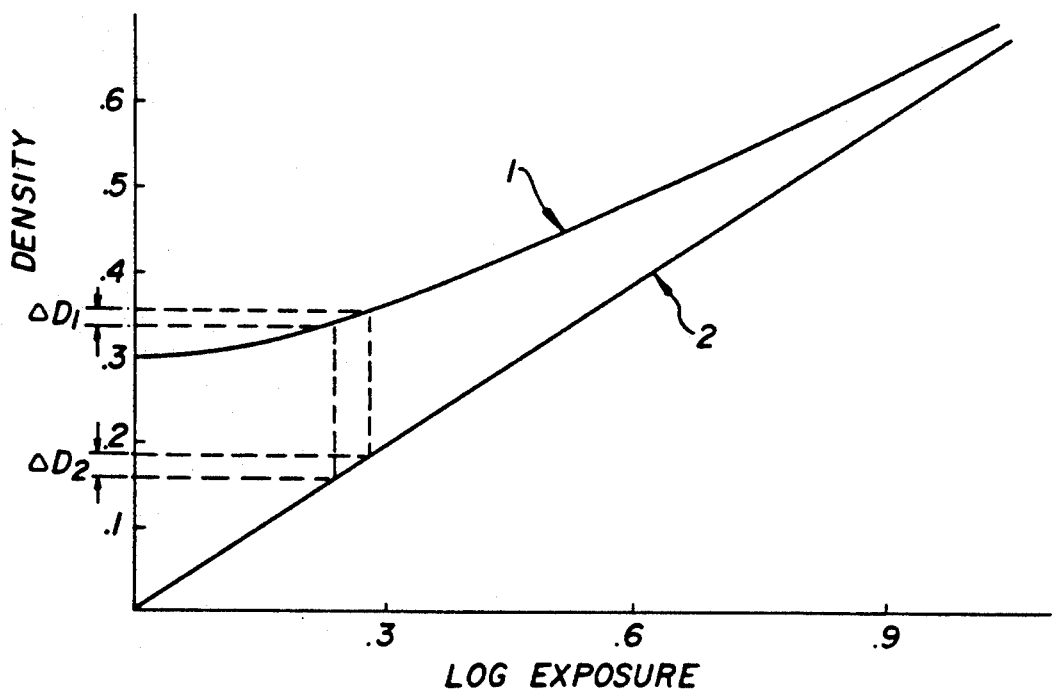
FIG. 2 shows both an example of a standard density vs log exposure curve and an example of a linearized version of such a standard curve.

The first step of constructing an inverse look-up table which is to reside in processor 14 in FIG. 1 is illustrated in FIG. 2. Curve 1 shows an example of the "toe" region of a plot of the negative density versus incident log exposure to the film. Curve 2 is formed by extending the straight line central portion (not shown) of Curve 1. Only the toe region is shown for clarity. A single set of curves are shown for the purposes of illustration, however it should be understood that three sets of curves are to be employed, one each for the red, the green, and the blue digital images. The dashed lines show the separation of the densities that would result from two neighboring exposures both on to the real film, exemplified by Curve 1, and an ideal "linearized" film, exemplified by Curve 2. The ratio given in equation (1) is a measure of the adjustment in contrast which would result at the indicated point in the "toe" resulting from linearizing Curve 1.

$$\gamma = \frac{\Delta D2}{\Delta D1} \quad (1)$$

where $\Delta D1$ is the density difference which would result in the actual film (Curve 1) from two nearly equal exposures, $\Delta D2$ is the corresponding density difference which would result in the linearized film (Curve 2) from the same two exposures, γ is the contrast adjustment factor required to linearize Curve 1.

As the slope of Curve 1 approaches 0 at low exposures, ΔD1 also approaches 0, and in this idealization the contrast adjustment would increase without limit. However, this is not practical when applied to an actual film converted to an actual digital image. All real films exhibit grain noise when scanned with apertures of a practical size, and furthermore all digital images will contain some noise due to being forced to represent their magnitude at each point using numbers of finite precision (i.e., quantization noise). These two sources of noise remain of finite extent even in the portion of the toe of Curve 1 which has a vanishingly small slope. Thus if the straightening processes exemplified by Curve 2 were carried to its extreme limit, this noise would be magnified by an unlimited amount. Of course, this would have a negative impact on image quality.

However, this problem can be controlled while much of the benefit to the tone scale of the image can be achieved by limiting the contrast adjustment to some maximum upper limit, such as 4.0. This partial linearization can be represented in the following functional form:

$$\gamma = \frac{\Delta D2}{\Delta D1}$$

$$\gamma' = \gamma \quad \text{if } \gamma < \gamma_{max} \tag{2}$$
$$\gamma' = \gamma_{max} \quad \text{if } \gamma \geq \gamma_{max}$$

where

γ, ΔD2, and ΔD1 have the same meaning as in equation (1),

γ' is contrast adjustment to apply to Curve 1 to achieve the partially linearized density, $\gamma_{max}$ is the maximum value which should be used to achieve the partial linearization of Curve 1.

The maximum limit, $\gamma_{max}$, is set at a different level depending on the noise contained in the digital image. Thus for low noise film such as KODAK EKTAR25 negative film recorded with 10 bits of precision, the upper limit to the adjustment may be as high as 8. Conversely with higher noise film such as KODAK GOLD1600 or film recorded with a lower bit resolution, the upper limit to the adjustment may be only 2.

In order to achieve the improvement, an estimate of the minimum density from the film used to capture the image must be obtained. This may be done by scanning an unexposed portion of the same film strip as that upon which the image was captured, and by converting those scan signals to a digital image which has been converted from the film's R,G,B transmission to it's R,G,B density using means such as described in FIG. 1. Any convenient area may be scanned in order to find the minimum density. For instance, one could scan the narrow regions between the frames, or in clear areas along the edge of the film, or on the leader before the first image or after the last image.

When the scanning is done using a relatively large aperture which would be satisfactory to generate a digital image for output to a relatively low resolution reproduction medium such as standard broadcast video, then the density data so generated may then be searched for its lowest R,G, and B values. These values may then be used as the estimate the minimum density.

However if the scanning is done using a relatively small aperture which would be needed to generate a digital image for output by a high resolution output device, then for each of the R,G,B images an nxn array of neighboring scan values should be averaged together in transmission space and that average value reconverted to density. The value of "n" will usually lie in the range from 4 to 32. This process will result in a second lower resolution R,G,B image which can be searched for its lowest R,G, and B values. These values may then be used as a less noisy estimate of the minimum density.

After the minimum density is found, the image bearing portion of the film must also be scanned and converted to an R,G,B digital density image using the same means as described for FIG. 1. The digital image may then be shifted in such a way that after the shift it would have the same density values as if it had been captured on the standard film exemplified by Curve 1 in FIG. 2. Finally, the digital image must be adjusted by a function which increases the slope according to the functional form given in (2) above. This may be done by passing the digital image through an LUT.

Figure 3:
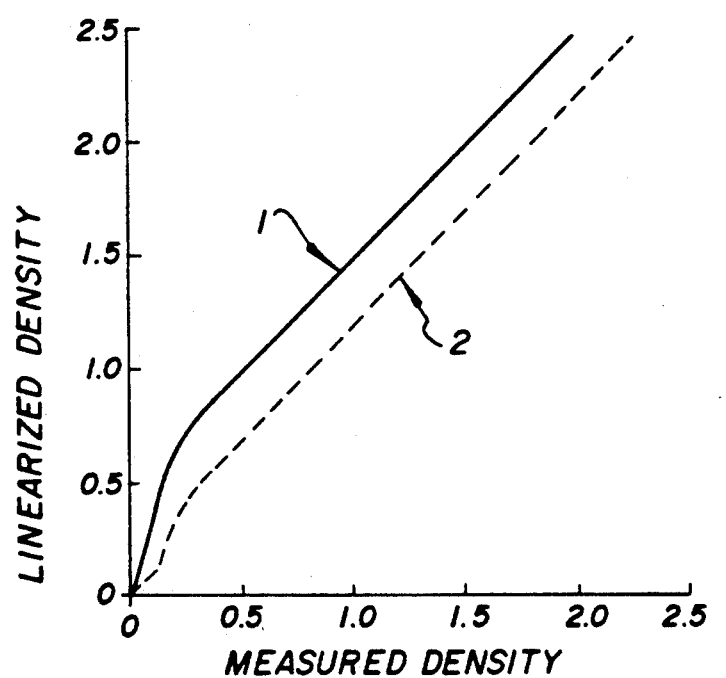
FIG. 3 shows a graphical representation of two possible embodiments of LUT's by which the range of the original scene exposures over which the images captured on film retain their linear character may be extended.

Referring to FIG. 3, Curve 1 is a graphical representation of such a LUT with the contrast adjustment having an upper limit of 4.0. The table may be generated by a numeric integration of the function (2) to create a LUT relating the measured density to the "linearized" density. This may be followed by a shifting of the output values of the table so that for at least one midscale input density the same output density is obtained.

As would be understood by those skilled in digital image processing art, the range of input values to the LUT is determined by the range of numeric values which characterize the input medium. As would be further understood by those skilled in digital image processing art, if in following the above method, some output values from the LUT turn out to be negative, and if the digital processing system can not tolerate such negative values in the output image, then a further shift may be introduced into the LUT output values in order to insure that the output image contains only positive values. This would, of course, necessitate that all subsequent processing steps anticipate the occurrence of numeric values for the digital image which will be larger than otherwise would have been the case.

Furthermore, it should be noted that the LUT values could be adjusted up or down to accommodate the actual minimum density of the film being scanned instead of adjusting the density of the image to accommodate the location of the minimum density in the LUT.

A second embodiment to the contrast adjustment can be obtained in the following way. At a some point on the toe of Curve 1, which depends on the noise in the digital image, the signal to noise ratio of a digital image of low modulation will reach a value below one. When this occurs, the potential benefit of an improved tone scale will be more than offset by the increased visibility of the noise. Thus below this point, not only is there no advantage of further increasing the contrast, but there is no advantage of increasing the contrast at all. Thus instead of maintaining the contrast adjustment at a constant value, the contrast adjustment should be gradually cut back in magnitude. One preferred example of a function which would gradually reduce the contrast adjustment back to 1 is given by the following equations:

$$\gamma = \frac{\Delta D2}{\Delta D1}$$

-continued $$\gamma' = \gamma \qquad \text{if } \gamma < \gamma_{max} \qquad (3)$$

$$\gamma' = 1 + \frac{A}{B + e^{(C\gamma - D)}} \qquad \text{if } \gamma \geq \gamma_{max}$$

where
- $\gamma$, $\Delta D2$, and $\Delta D1$ have the same meaning as in equation (1),
- $\gamma'$ is the contrast adjustment to apply to Curve 1 to achieve the partially linearized density,
- $\gamma_{max}$ is the maximum value which should be used to achieve the partial linearization of Curve 1.
- e is the Natural Logarithm base, and
- A,B,C,D are constants which depend upon the maximum contrast adjustment. For instance if the maximum contrast adjustment were to be 4.0, then A would equal 3.0 and B would about equal 0.632, if C were equal to 1.0 and D were equal to 5.0.

As with the first embodiment of the contrast adjusting function, equation (2) above, in which a maximum contrast adjustment was used, this improvement can also be achieved using a look-up table. This may be done by employing the procedure given above for the first embodiment except that the contrast adjusting function given by equation (3) is used in the numerical integration. Curve 2 in FIG. 3 is a graphical representation of such a LUT with the contrast adjustment having a maximum value of 4.0. As would be appreciated by those skilled in the art, other functions may also be employed to gradually reduce the contrast adjustment, all of which would still be within the scope of this invention.

Furthermore additional functionally may be built into the linearization LUT. For instance, the output values could all be multiplied by a constant which would adjust the overall image contrast to accommodate a standard data metric or to accommodate the down stream output device. In addition, the dynamic range of the contrast adjusted image can be limited as required by simply limiting the range of the output values from the LUT. Furthermore, the number of bits representing the image can be conveniently reduced by consolidating a number of input values into a single output value. Finally, the output image can be non-linearly transformed by the linearization LUT if required by the output device. So for instance, the LUT output values can be the negative anti-log of the negative of the contrast adjusted densities. As would be apparent to those skilled in the art, any mixture of this additional functionality may be obtained when using the linearization LUT.

While I have described the invention in reference to representative values for the image being digital values, as would be understood to those skilled in the manipulation of images, the invention could be practiced using any form for the representative values, including analog representations.

While I have shown and described the present invention in accordance with a preferred embodiment, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method for providing a color image with an extended linear response range so that an output image, having a full tone scale, may be reproduced from said color image without distortion in contrast or color balance, said method comprising the steps of:
   capturing said color image on color film;
   scanning said color film to obtain digitally encoded density values representative of the chromatic color content of said color image;
   forming a look-up table (LUT) for adjusting said encoded density values;
   adjusting said encoded density values of said color image using said LUT to extend said linear range of said color image; and
   reconstructing said output image from said adjusted density values using a film writer or display device.

2. The method of claim 1 further including the step of characterizing said color film by one or more chromatic transmission values proportional to the response of said color film to an original scene, and said original scene including corresponding one or more chromatic portions of the electromagnetic spectrum.

3. The method of claim 2 wherein said step of capturing said color image on said color film further comprises the step of exposing said color film to said original scene.

4. The method of claim 3 wherein said step of scanning further comprises the step of sampling a non-image-bearing portion of said color film at a plurality of points to obtain analog samples of said one or more chromatic transmission values.

5. The method of claim 4 wherein said step of sampling further comprises the step of sampling a leader, a trailer, one or more outer edges, or one or more interframe gaps.

6. The method of claim 5 wherein said step of sampling said non-image-bearing portion of said color film utilizes sensors that are sensitive to said corresponding one or more portions of said electromagnetic spectrum.

7. The method of claim 6 wherein said step of scanning further comprises the step of converting said analog samples of said transmission values into corresponding digital transmission values.

8. The method of claim 7 wherein said step of scanning further comprises the step of replacing each of said digital transmission values with an average transmission value obtained by averaging an array of neighboring digital transmission values centered at each of said digital transmission values.

9. The method of claim 8 wherein the step of averaging further comprises the step of averaging utilizing a rectangular array having first and second dimensions.

10. The method of claim 9 wherein said step of scanning further comprises the step of converting said averaged digital transmission values to corresponding averaged digital density values.

11. The method of claim 10 wherein said step of scanning further comprises the step of searching said averaged digital density values to determine a reference minimum density value corresponding to each of said chromatic portions of said electromagnetic spectrum.

12. The method of claim 11 wherein said step of scanning further comprises the step of sampling an image-bearing portion of said color film at a plurality of points to obtain analog samples of said one or more chromatic transmission values of said color image.

13. The method of claim 12 wherein said step of sampling said image-bearing portion of said color film utilizes sensors that are sensitive to said corresponding one or more portions of said electromagnetic spectrum.

14. The method of claim 13 wherein said step of scanning further comprises the step of converting said analog samples of said transmission values of said color image into corresponding digital transmission values.

15. The method of claim 14 wherein said step of scanning further comprises the step of replacing each of said digital transmission values with one average transmission value obtained by averaging an array of neighboring digital transmission values centered at each of said digital transmission values.

16. The method of claim 15 wherein the step of averaging further comprises the step of averaging utilizing a rectangular array having first and second dimensions.

17. The method of claim 16 wherein said step of scanning further comprises the step of converting said averaged digital transmission values of said color image into corresponding averaged digital density values.

18. The method of claim 17 wherein said step of scanning further comprises the step of searching said averaged digital density values to determine a reference minimum density value corresponding to each of said chromatic portions of said electromagnetic spectrum.

19. The method of claim 18 wherein said step of forming said LUT further comprises the step of forming one or more elements of said LUT using a measure of contrast adjustment required to extend said linear range.

20. The method of claim 19 wherein said step of forming said LUT further comprises the step of comparing first density values obtained from the toe and shoulder regions of a standard density versus log exposure curve of said color film with second density values obtained from the mid-scale region of said standard curve.

21. The method of step 20 wherein said step of forming said LUT further comprises the step of searching said first density values to determine minimum density values from said standard curve.

22. The method of claim 21 further comprising the step of shifting said digital density image, so that said reference minimum density values from said non-image-bearing portion of said color film match said minimum density values obtained from said standard curve.

23. The method of claim 22 wherein said step of adjusting further comprises the step of adjusting said shifted digital density image using said LUT.

24. The method of claim 22 further comprising the step of shifting said LUT, so that said reference minimum density values from said non-image-bearing portion of said color film match said minimum density values obtained from said standard curve.

25. The method of claim 24 wherein said step of adjusting further comprises the step of adjusting said digital density image using said shifted LUT.

26. The method of claim 19, 23, or 25 wherein said step of forming said LUT further comprises the step of limiting the range of said measure of contrast adjustment.

27. The method of claim 26 wherein said step of limiting said range of said measure of contrast adjustment further comprises the step of limiting said measure of contrast adjustment to a maximum value.

28. The method of claim 27 wherein said step of limiting said range of said measure of contrast adjustment further comprises the step of limiting said measure of contrast adjustment to said maximum value after which the value is gradually returned to 1.

29. The method of claim 28 wherein said step of limiting said range of said measure of contrast adjustment further comprises limiting the step of said measure of contrast adjustment to said maximum value after which the value is gradually returned to 1 according to $$1 + \frac{A}{B + e^{(C\gamma - D)}}$$

* * * * *